United States Patent [19]
Kaliszewski et al.

[11] Patent Number: 5,390,955
[45] Date of Patent: Feb. 21, 1995

[54] STEERING COLUMN RELEASE CAPSULES

[75] Inventors: Thomas S. Kaliszewski; David E. Thomas, both of Rochester Hills; William M. Snell, Grand Blanc, all of Mich.

[73] Assignee: Chrysler Corporation, Highland Park, Mich.

[21] Appl. No.: 172,308

[22] Filed: Dec. 23, 1993

[51] Int. Cl.$^6$ .............................................. B62D 1/11
[52] U.S. Cl. ........................................ 280/777; 74/492
[58] Field of Search .................. 280/775, 777; 74/492

[56] References Cited
U.S. PATENT DOCUMENTS

| | | | |
|---|---|---|---|
| 4,102,217 | 7/1978 | Yamamoto et al. | 74/492 |
| 4,241,937 | 12/1980 | Eggen et al. | 280/777 |
| 4,452,096 | 6/1984 | Workman | 74/492 |
| 4,949,992 | 8/1990 | Abramczyk | 280/777 |
| 5,081,879 | 1/1992 | Pidgeon | 74/492 |

Primary Examiner—Kenneth R. Rice
Attorney, Agent, or Firm—Edward A. Craig

[57] ABSTRACT

A support for the steering column of an automobile has capsules for dampening vibration while the automobile is in motion. A bracket on the steering column has flanges which are clamped between the capsules. The bracket flanges are frictionally held by the capsules but will break free of the frictional hold to permit collapse of the steering column in the event of a collision. The flanges and capsules are tapered so that when the driver is thrown forward against the steering wheel upon vehicle impact, the initial collapse of the steering column reduces the frictional hold to zero, thus eliminating frictional drag during further collapse of the steering column.

8 Claims, 2 Drawing Sheets

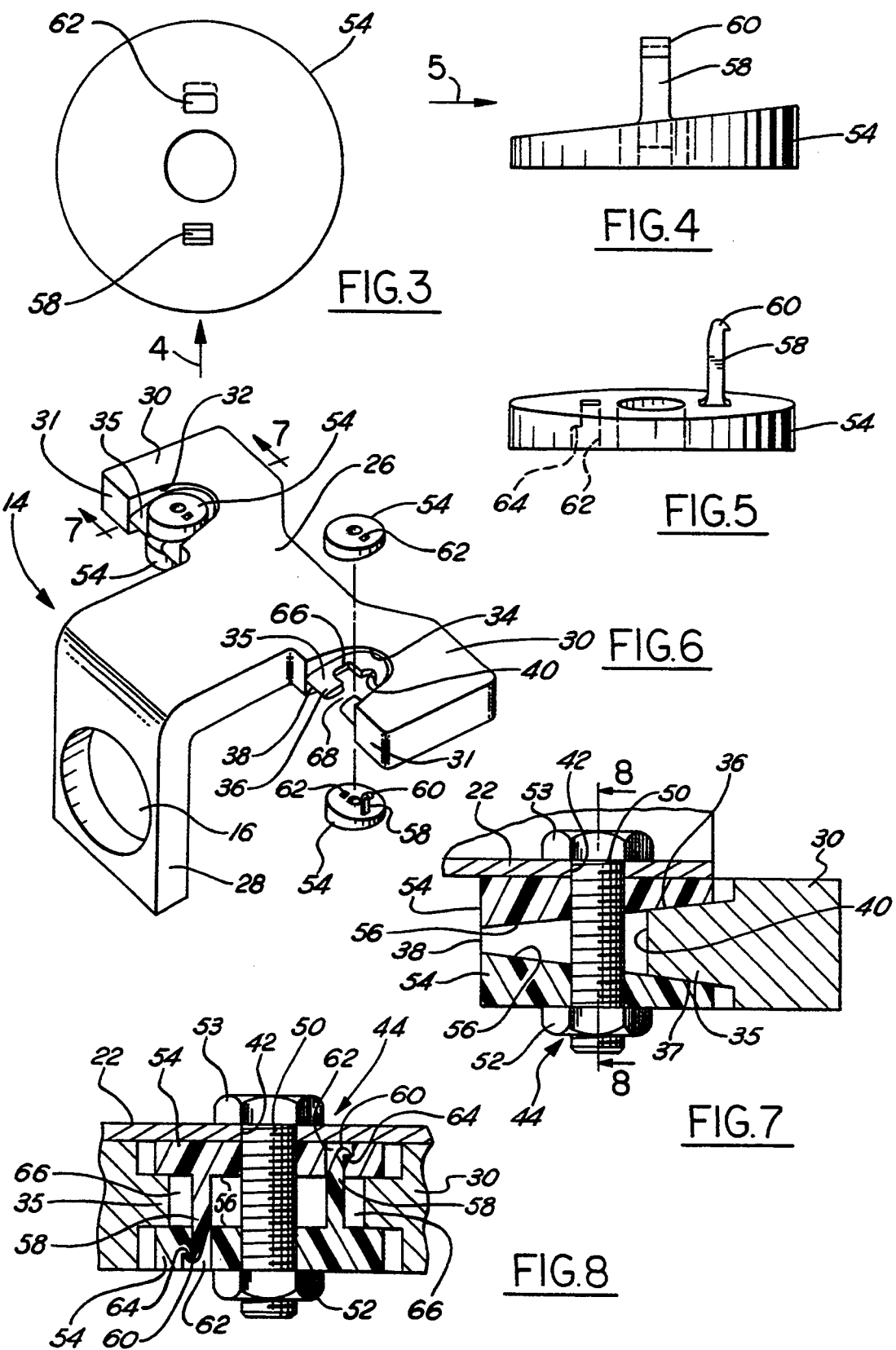

STEERING COLUMN RELEASE CAPSULES

FIELD OF THE INVENTION

This invention relates to a steering column support assembly for an automobile with capsules for dampening vibration but releasable so as not to impede collapse of the steering column in a collision.

BACKGROUND AND SUMMARY

A steering column tends to vibrate while the vehicle is in motion. To inhibit vibration, dampeners often in the form of capsules or discs, are provided. The capsules usually are formed of a plastic material and have a frictional hold on the mounting bracket of the steering column. In the past, the frictional hold of the capsules has impeded collapse of the steering column, particularly when the capsules were made of plastic which has a relatively high coefficient of friction.

In accordance with this invention, one and preferably two flanges of the steering column mounting bracket are clamped between vibration dampening capsules. The capsules are preferably made of plastic. The bracket flanges are tapered or wedge-shaped. The surfaces of the capsules which engage the bracket flanges are also tapered. In the event of a vehicle impact in which the driver is thrown forward against the steering wheel, initial collapse of the steering column results in reducing the frictional hold of the capsules to zero, thus eliminating drag on the steering column during further collapse.

An object of this invention is to provide a steering column support assembly with releasable capsules having the foregoing features.

Another object is to provide a steering column support assembly composed of a relatively few simple parts, and which is easy and inexpensive to manufacture and assemble.

Other objects, features and advantages of the invention will become more apparent as the following description proceeds, especially when considered with the accompanying drawings.

BRIEF DESCRIPTION OF THE DRAWINGS

FIG. 3 is a plan view of a vibration dampening capsule used in the support structure shown in FIGS. 1 AND 2.

FIG. 4 is a view of the capsule looking in the direction of the arrow 4 in FIG. 3.

FIG. 5 is a view of the capsule looking in the direction of the arrow 5 in FIG. 4.

FIG. 6 is a perspective view of the mounting bracket, showing the capsules of one fastener assembled on the mounting bracket and the capsules of the other fastener separated from the mounting bracket, and with the nuts and bolts of the fasteners removed.

FIG. 7 is a sectional view taken on the line 7—7 of FIG. 6.

FIG. 8 is a sectional view taken on the line 8—8 of FIG. 7.

DETAILED DESCRIPTION

Figure 1:
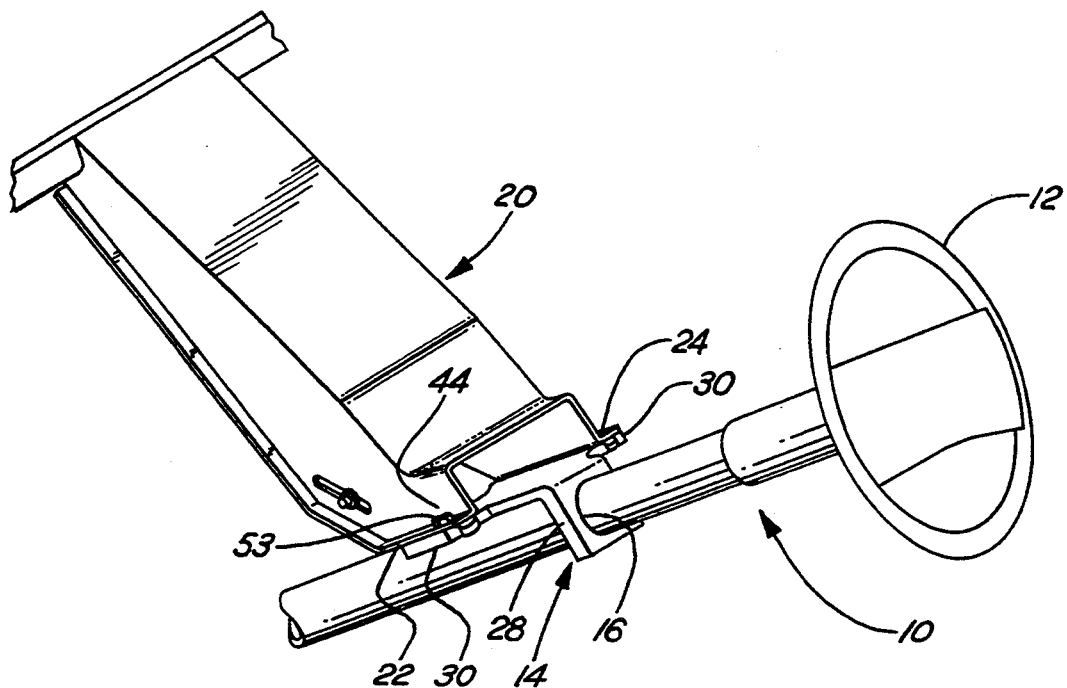
FIG. 1 is a perspective view of a support for the steering column of an automobile, constructed in accordance with the invention.
Figure 2:
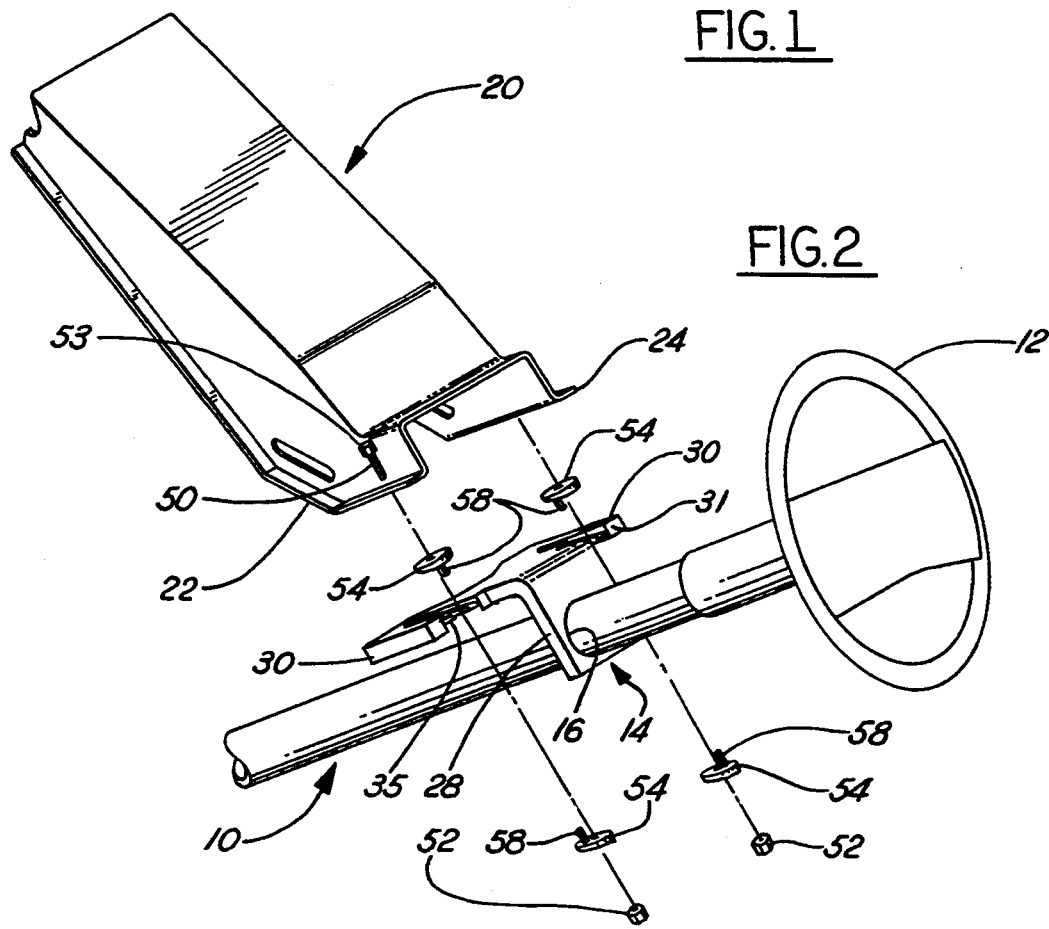
FIG. 2 is an exploded perspective view of the steering column support shown in FIG. 1.

Referring now more particularly to the drawings, there is shown an elongated steering column 10 of an automotive vehicle. The steering column extends upwardly and rearwardly and has a steering wheel 12 at the upper end.

A mounting bracket 14 has an opening 16 through which the steering column 10 extends. The bracket 14 is secured to the steering column by any suitable means.

Support structure 20 for the steering column is rigidly secured to the frame of the vehicle. The support structure 20 is channel-shaped and extends downwardly and rearwardly toward the bracket 14 on the steering column. The support structure 20 has laterally spaced parallel flanges 22 and 24 at the lower end.

The bracket 14 has a flat plate 26 with a central extension at the rear which is turned down at a right angle to provide a mounting portion 28. The hole 16 through which the steering column extends is formed in the mounting portion 28. The flat plate 26 of the bracket has wings 30 extending beyond the opposite sides of the steering column. The upper surfaces of the wings 30 occupy a common plane which is parallel to the central axis of the steering column. The wings 30 extend beneath the flanges 22 and 24 of the support structure and the flat upper surfaces of the wings are in surface-to-surface supporting engagement with flanges 22 and 24.

The rear edge portions 31 of the wings have recesses 32 and 34 on opposite sides of the steering column. Filling each recess is an integral flange 35. The flanges 35 are thinner than the wings and each has top and bottom surfaces 36 and 37 which are tapered from the base of each recess to their rear edge 38, so that the flanges 35 are thicker at the base than at the rear edge. In other words, the flanges are tapered in a rearward direction, which is opposite the direction of collapse of the steering column. Each flange 35 has a hole 40 formed more or less centrally therethrough. The flanges 22 and 24 of the support structure 20 also have holes 42 which register with the holes 40.

Identical fastener assemblies 44 are provided to secure the bracket flanges 35 to the flanges 22 and 24 of the support structure 20. Each fastener assembly has a bolt 50 and a nut 52. The bolt extends through the registering holes 40 and 42 in the flanges 22,24 and 35 with the heads 53 of the bolts engaging the tops of the supporting flanges 22 and 24 and the nuts 52 threaded on the lower ends of the bolts.

A pair of dampeners are provided for each fastener assembly to minimize vibration. These dampeners are in the form of ring-like discs or capsules 54 sleeved on the bolts with a bracket flange 35 in between. The capsules 54 are preferably identical and each has an inner surface 56 which is tapered at the same angle as the top or bottom surface of a flange 35 which it contacts. The capsules are preferably made of a suitable resinous plastic material. The bracket flanges 35 are frictionally held between the capsules 54 when nuts 52 are tightened.

Each capsule 54 has a latch pin or prong 58 on one side of its center opening which extends axially from its tapered surface and terminates in a hook 60. Each capsule has a hole 62 on the side of its center opening opposite the latch pin. This hole 62 is enlarged near the outer surface to provide a shelf-like catch 64. The hook of the latch pin on one capsule of each pair engages the catch 64 in the hole 62 of the other to releasably lock the capsules together. The bracket flanges 35 have clearances 66 extending outwardly from the holes 40 to clear the pins. The latch pins 58 hold the capsules together, but are shearable so as not to impede steering column collapse.

The latch pins 58 lock the capsules together so that they will not fall away during assembly of the fasteners.

Each bracket flange has a slot 68 extending from the hole 40 to the rear edge 38. The width of slots 68 is greater than the diameter of the bolts 50 to clear the bolts in the event of a collision.

In use, and with the fastener assemblies 44 clamping the flanges 35 of the mounting bracket 14 to the flanges 22 and 24 of the support 20, as shown in FIGS. 7 and 8, the steering column is securely attached to the support structure 20 and the capsules 54 minimize vibration. If the steering column should collapse axially due to the force of the driver's chest hitting the steering wheel in a front end collision, the tapered surfaces of the capsules 54 and flanges 35 will initially release the frictional hold of the capsules on the flanges and allow further collapse of the steering column unimpeded by any clamping pressure of the capsules. The bolts 50 will move through the slots 68 and the latch pins 58 will shear upon contact with the walls of clearances 66 so that the bracket 14 will readily break away from the clamping effect of the fastener assemblies 44.

One of the unique features of this invention is that the frictional hold of the capsules on the mounting bracket of the steering column is removed as soon as the steering column begins to collapse. The release load can be altered by changing the angle of the tapered surfaces 36 and 37 of the mounting bracket and the tapered surfaces 56 of the capsules and also by changing the cross section of the latch pins.

What is claimed is:

1. Apparatus for supporting the elongated steering column of an automotive vehicle and dampening vibration of the steering column when the vehicle is in motion and also permitting axial collapse of the steering column in a collision, comprising support structure secured to the vehicle frame, a bracket secured to the steering column, and means for clamping said bracket to said support structure comprising a support flange on said support structure, a bracket flange on said bracket opposed to said support flange, a fastener assembly connecting said flanges, said fastener assembly comprising a bolt and a nut threaded on said bolt, vibration dampeners carried by said bolt, said bracket flange being clamped between said dampeners and frictionally held by said dampeners when said nut is tightened but capable of breaking free of the frictional hold of the dampeners to permit collapse of the steering column in the event of a collision, said bracket flange being tapered in a direction opposite the direction of collapse of the steering column to facilitate release of the frictional hold of the dampeners on said bracket flange.

2. Apparatus as defined in claim 1, wherein said dampeners have surfaces frictionally engaging said bracket flange and tapered to match the taper of said bracket flange.

3. Apparatus as defined in claim 1, wherein said dampeners are capsules made of a resinous plastic material.

4. Apparatus as defined in claim 1, wherein said flanges have aligned holes through which said bolt extends, and a slot in said bracket flange communicating with the hole in said bracket flange to clear said bolt in the event of steering column collapse.

5. Apparatus as defined in claim 1, wherein said dampeners are releasably interconnected by shearable pins.

6. Apparatus for supporting the elongated steering column of an automotive vehicle and dampening vibration of the steering column when the vehicle is in motion and also permitting axial collapse of the steering column in a collision, comprising support structure secured to the vehicle frame, a bracket secured to the steering column, and means for clamping said bracket to said support structure comprising laterally spaced first and second support flanges on said support structure, laterally spaced first and second bracket flanges on said bracket at opposite sides of the steering column and respectively opposed to said first and second support flanges, said first flanges having aligned holes and said second flanges having aligned holes, a first fastener assembly connecting said first flanges, said first fastener assembly comprising a first bolt extending through the aligned holes in said first flanges and a first nut threaded on said first bolt, first vibration dampener capsules made of resinous plastic material carried by said first bolt, said first bracket flange being clamped between said first capsules, a second fastener assembly connecting said second flanges, said second fastener assembly comprising a second bolt extending through the aligned holes in said second flanges, and a second nut threaded on said second bolt, second vibration dampener capsules made of resinous plastic material carried by said second bolt, said second bracket flange being clamped between said second capsules, said first and second bracket flanges being frictionally held by said first and second capsules when said nuts are tightened but capable of breaking free of the frictional hold of the capsules to permit collapse of the steering column in the event of a collision, said bracket flanges being tapered in a direction opposite the direction of collapse of the steering column to facilitate release of the frictional hold of the capsules on said bracket flanges, and said capsules having surfaces frictionally engaging said bracket flanges and tapered to match the taper of said bracket flanges.

7. Apparatus as defined in claim 6, wherein said bracket flanges have slots communicating with the holes therein to clear said bolts in the event of steering column collapse.

8. Apparatus as defined in claim 7, wherein said first capsules are releasably interconnected by first shearable pins, and said second capsules are releasably interconnected by second shearable pins, and said first and second bracket flanges have clearance spaces to accommodate said pins.

* * * * *